Feb. 23, 1926.
C. H. GILL
1,574,620
DIFFERENTIAL TRANSMISSION MECHANISM
Filed March 16, 1925  4 Sheets-Sheet 4
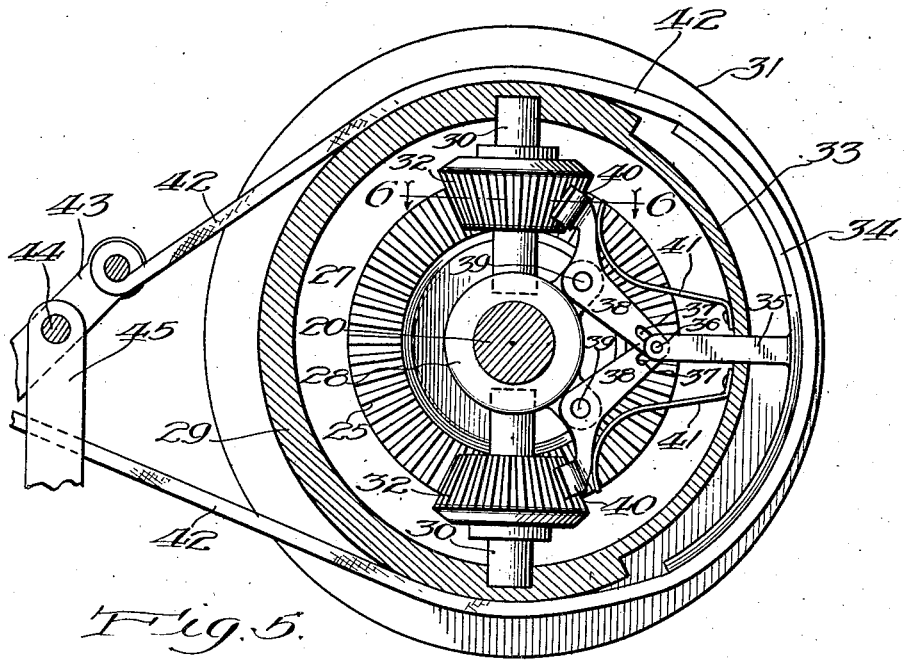
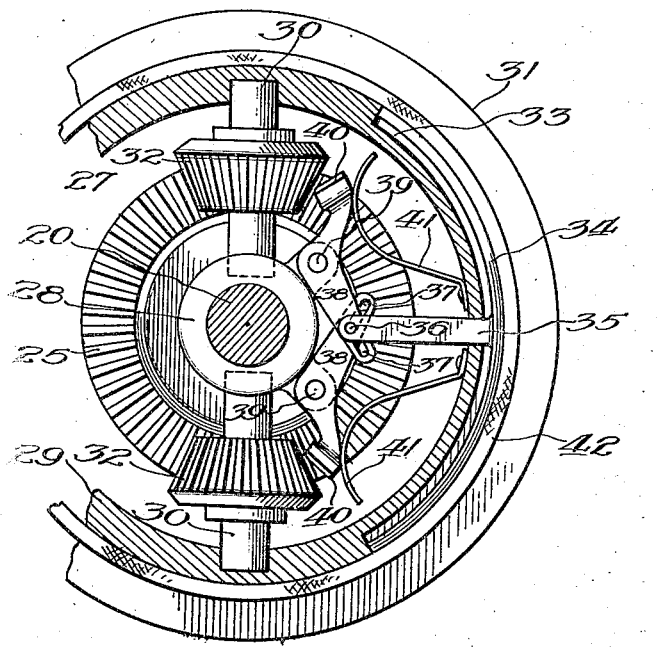
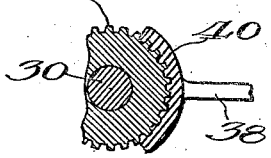
Inventor:
Charles H Gill Patented Feb. 23, 1926.

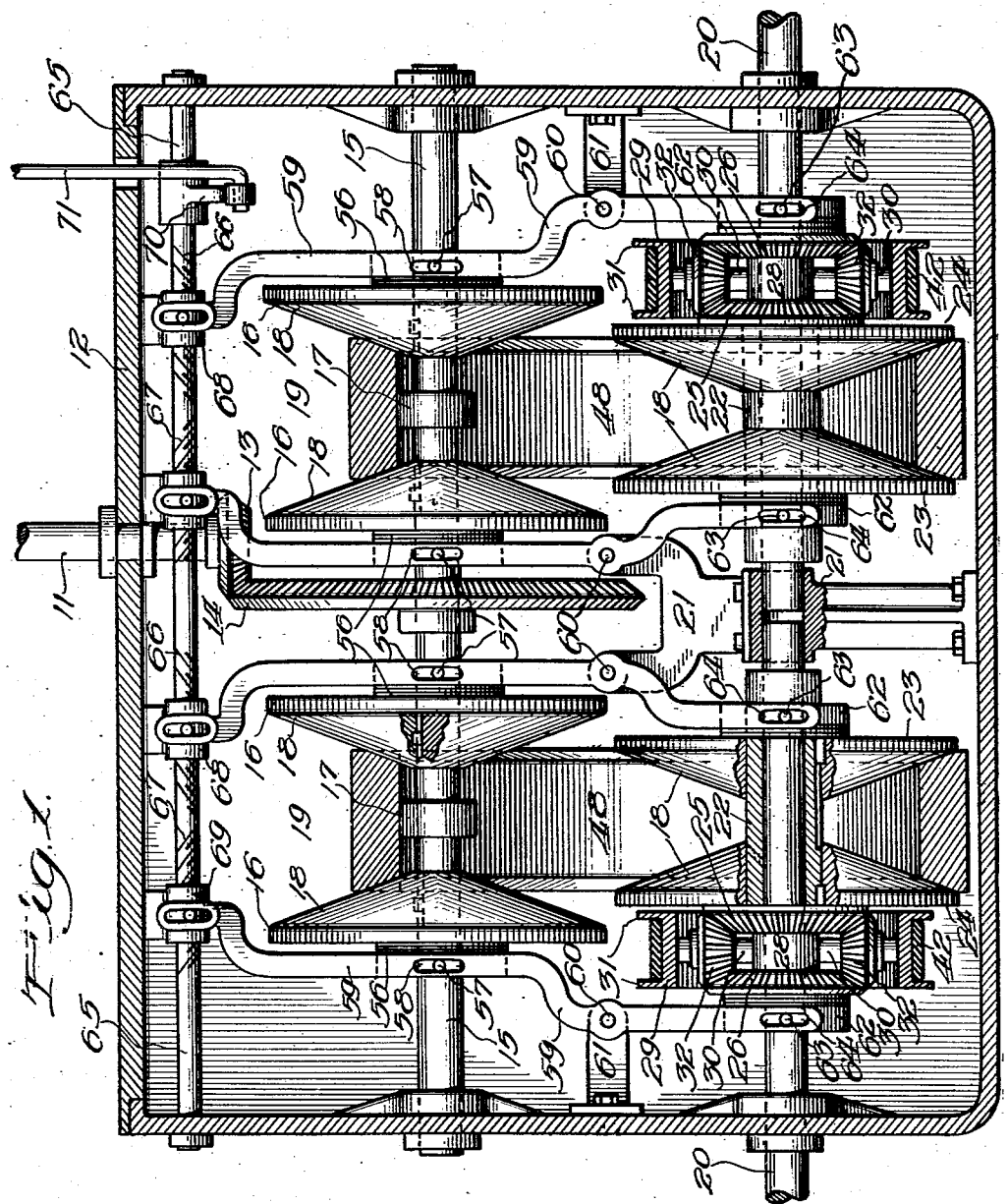

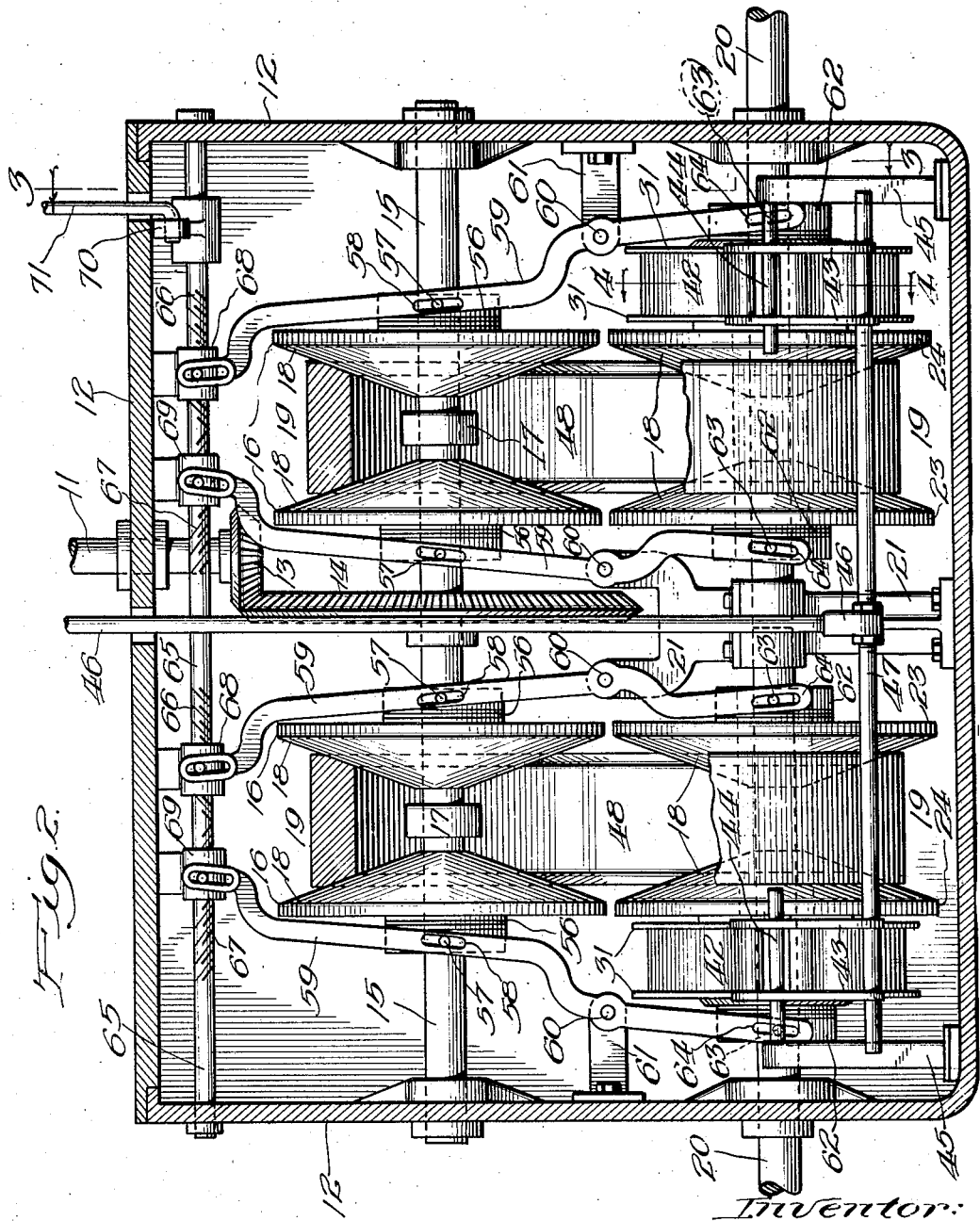

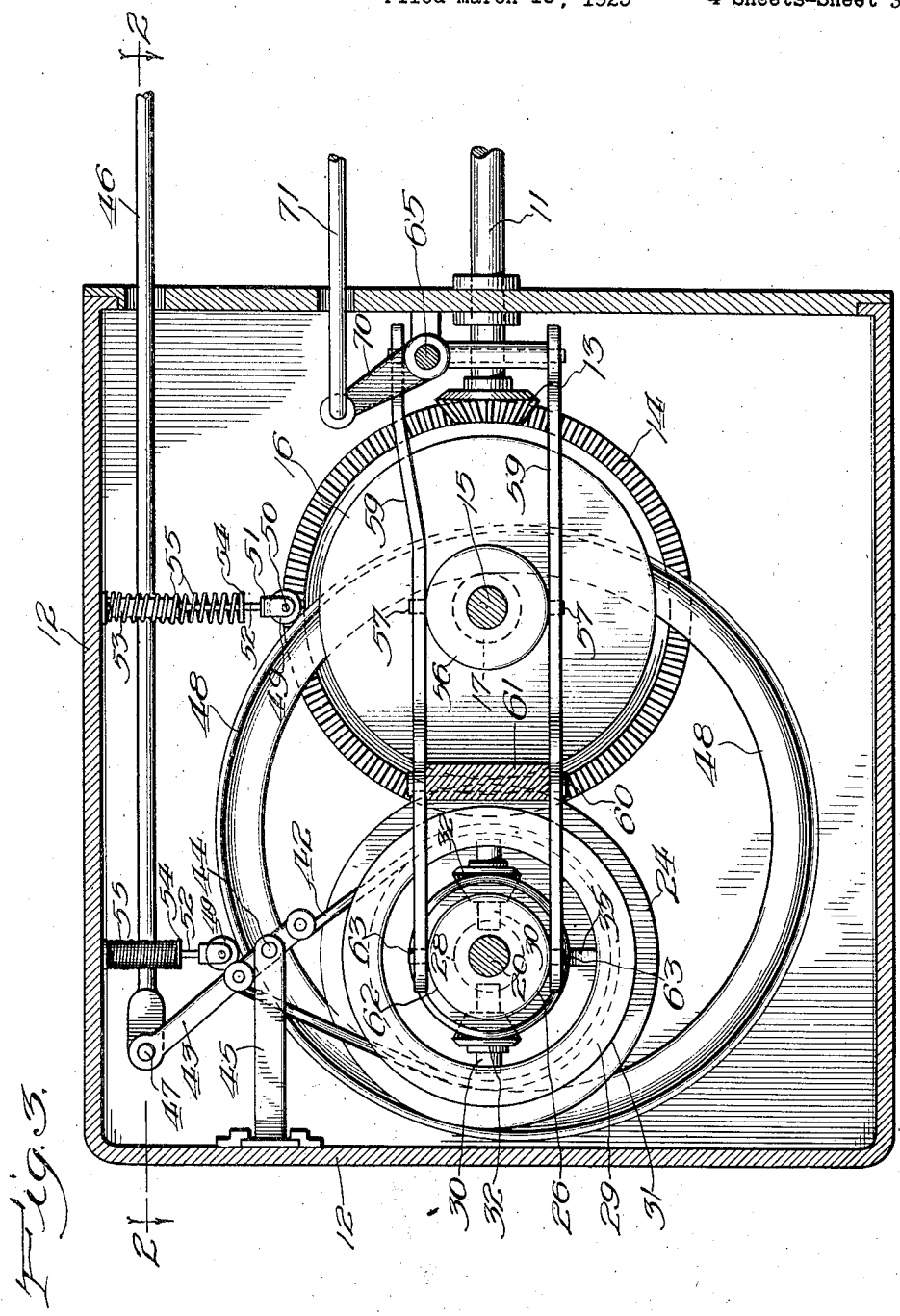

1,574,620

UNITED STATES PATENT OFFICE.

CHARLES H. GILL, OF CHICAGO, ILLINOIS, ASSIGNOR TO THE AUTODRIVE COMPANY, A CORPORATION OF DELAWARE.

DIFFERENTIAL TRANSMISSION MECHANISM.

Application filed March 16, 1925. Serial No. 15,952.

*To all whom it may concern:*

Be it known that I, CHARLES H. GILL, a citizen of the United States, and resident of Chicago, in the county of Cook and State of Illinois, have invented certain new and useful Improvements in Differential Transmission Mechanism, of which the following is a specification.

My invention relates to mechanism adapted to vary the ratio of the rotary speeds of driven shafts to the rotary speeds of a driving shaft and to provide means allowing either of the said driven shafts to be rotated at speeds differing from the speeds of the other of said driven shafts or for both of said driven shafts to be rotated at like speed.

In effect, my invention combines in a single mechanism the functions of the ordinary transmission or ratio changing mechanism and the differential mechanism as employed upon motor vehicles. It further renders the employment of a clutch mechanism unnecessary.

In connection with this application, reference may be had to my copending application for patent for improvements in ring transmission mechanism, Serial No. 742,659, filed October 9th, 1924.

The objects of my invention are, first, to provide a driving shaft carrying a multiplicity of pulleys having annular grooves therein substantially V-shaped in cross-section; second, to provide a multiplicity of driven shafts, each carrying one or more pulleys having annular grooves therein substantially V-shaped in cross-section; third, to provide a multiplicity of rings beveled to correspondingly V-shaped cross-sectional aspect encircling and suspended each respectively from one of the said pulleys carried by the said driving shaft and from one of the said pulleys upon one of the said driven shafts, each in wedging frictional driving or driven engagement with one or both of its respective supporting pulleys; fourth, to provide means tending to urge said rings into continuous engagement with said pulleys and to prevent jars and jolts from interrupting their operative contact; fifth, to construct the said pulleys each of two separate circular halves, those upon the said driving shaft being splined thereon and those upon the said driven shafts being loosely mounted thereon with all of said pulley halves being adapted for sliding longitudinal movement upon their respective shafts; sixth, to provide means for moving each half of each of said pulleys toward or away from its complementary half and to cause the halves upon the said driving shaft to recede from each other as the halves upon the said driven shafts approach each other and vice-versa; seventh, to provide a control lever adapted to control the said means at the will of the operator; eighth, to provide means for transmitting rotary motion to said driving shaft; ninth, to provide means for locking the respective halves of each of the said pulleys upon the said driven shafts together for rotation; tenth, to provide means for locking the said pulleys upon the said driven shafts thereto for rotation therewith or for unlocking the said pulleys from the said driven shafts; and, eleventh, to provide means under the control of the operator for reversing the direction of rotation of the said driven shafts relative to the direction of rotation of the said pulleys upon said driven shafts.

I attain these objects, and others as may hereinafter appear, by means of the mechanism illustrated in the accompanying drawings, in which—

Figure 1 is a partly sectional plan view of my transmission; Figure 2 is a similar partly sectional plan view taken on the line 2—2 of Figure 3 and showing rings and related parts in different position; Figure 3 is a section taken on the line 3—3 of Figure 2; Figure 4 is an enlarged detail section taken on the line 4—4 of Figure 2; Figure 5 is a fragmentary view similar to Figure 4 but with some of the parts in different position; and Figure 6 is a detail section taken on the line 6—6 of Figure 4.

Similar numerals designate similar parts throughout the several views.

A propeller shaft 11, shown broken away in Figures 1, 2, and 3, leads from a source of power (not shown) and is journaled in a casing 12 housing my combined differential and speed-changing mechanism. The propeller shaft 11 carries a bevel pinion 13 which engages with a bevel gear wheel 14 secured upon a driving shaft 15 journaled in the casing 12. Two pulleys, each consisting of two separate halves 16, are carried by the driving shaft 15 with each pulley-half splined upon the shaft 15 for rotation therewith and free sliding movement longitudinally of and upon said driving shaft. Collars or rollers 17 are loosely mounted upon the shaft 15 for free rotation thereon, one between each pair of pulley-halves 16. The pulley halves 16 are each provided with bevelled surfaces 18 and arranged upon the shaft 15 in pairs, the bevelled surfaces 18 of each pair facing each other to form annular channels or grooves 19 in each complete pulley, these channels presenting substantially a V-shape in cross-section, and the widths of the channels 19 varying according to the spacing apart of the halves 16.

Two driven shafts 20 are each journaled in the casing 12 and in a bearing member 21 secured to the casing 12, the driven shafts 20 having their axes in line with each other. The driven shafts 20 are shown broken away outside the casing 12 but, where this mechanism is employed in a motor vehicle, the shafts 20 extend outwardly and operate the vehicle driving wheels.

Each of the driven shafts 20 are provided with sleeves 22 adapted to rotate and slide longitudinally thereon and pulley-halves 23 are splined upon each of the sleeves 22. Pulley-halves 24 are secured upon the sleeves 22 and each pulley-half 23 and 24 is provided with a bevelled surface 18 corresponding in angle to the bevelled faces 18 of the pulley-halves 16, and the bevelled surfaces 18 of each pair of pulley-halves face each other forming annular grooves or channels 19 presenting substantially a V-shape in cross-section, and the widths of the channels 19 varying according to the spacing apart of the halves 23 and 24 of each pair.

Bevel gear wheels 25 are secured to or made integral with the pulley-halves 24 and bevel gear wheels 26 are splined upon each of the driven shafts 20 respectively. Wheels 27, consisting of hub-portions 28, rim-portions 29 and rounded, shaft-like spokes 30, have flanges 31 and are mounted upon the driving shafts 20 for free rotation and sliding longitudinal movement thereon and between the bevel gear wheels 25 and 26. Bevel pinions 32 are mounted upon the spoke-shafts 30 for free rotation, but not for longitudinal movement thereon, and the bevel pinions each engage with the bevel gear wheels 25 and 26.

The rim-portions 29 of wheels 27 are provided with depressions 33 adapted to receive curved members 34 to be flush with the rim-portions 29 and also provided with openings through which arms 35 supporting the curved members 34 pass. The arms 35 are provided with pins 36 which engage in slots 37 in detent members 38 which are pivoted upon the hub-portions 28 by means of pins 39 and carry toothed portions 40 adapted to be pressed into locking engagement with the teeth of the bevel pinions 32 by springs 41 having one of their ends secured to the rim-portions 29.

Brake bands 42 encircle the rim-portions 29 of the wheels 27, being retained in place by the flanges 31, and one of the ends of each brake band 42 is secured to brake levers 43 at equal distances above and below pins 44 which pivot the brake levers 43 upon standards 45 secured to and projecting from the casing 12. A rod 46 is hingeably secured to the center of an equalizing bar 47 to which the brake levers 43 are hingeably secured. The rod 46, which is illustrated broken away, normally leads to a control lever or pedal, not shown. The equalizing bar 47 passes freely through openings in the brake levers 43, being thus hingeably secured to the brake levers while permitting the brake levers to move longitudinally of the equalizing bar 47.

Rings 48 having bevelled sides to conform to the bevelled surfaces 18 of the various pulley-halves and presenting substantially a V-shape in cross-section each encircle the driving shaft 15 and one of the driven shafts 20, being suspended therefrom and in wedging frictional engagement with the bevelled surfaces 18, the axes of the rings 48 being below the axes of the driving shaft 15 and of the driven shafts 20.

To prevent the rings 48 from being jarred out of effective engagement rollers 49, the axes of which are in the same vertical transverse planes as the axes of the shafts 15 and 20, are provided and bear against the peripheries of the rings 48. The rollers 49 are loosely mounted upon pins 50 mounted in bifurcated brackets 51 secured to rods 52. The rods 52 telescope within hollow brackets 53 secured to the casing 12. The rods 52 have collars 54 fixed thereon against which spiral springs 55 press, the said springs surrounding the brackets 53.

Collars 56 are loosely mounted upon the driving shaft 15 and adapted to abut the pulley-halves 16 on their non-bevelled sides, the collars 56 having pins 57 projecting therefrom and into slots 58 in levers 59. The levers 59 are pivoted by means of pins 60 upon the bearing member 21 and upon brackets 61 secured to the casing 12. Other collars 62 are loosely mounted upon the driven shafts 20 and adapted to press against the pulley-halves 23 and against the bevel gear wheels 26, the collars 62 having pins 63 projecting therefrom and into slots 64 in the levers 59.

A shaft 65 is journaled in the casing 12 and provided with threads 66 disposed in one direction and with threads 67 disposed in the opposite direction. Internally threaded collars 68 are mounted upon the shaft 65 in engagement with the threads 66 and internally threaded collars 69 are also mounted upon the shaft 65 in engagement with the threads 67. A lever 70 is secured upon the shaft 65 and a control rod 71 is hingeably secured to the lever 70. The control rod 71 is illustrated broken away but is adapted to extend outwardly to a convenient location for a control lever or pedal to which its further end may be hingeably secured.

In operation, rotary motion in a constant direction is transmitted from the source of power through the propeller shaft 11, the bevel pinion 13, and the bevel gear wheel 14 to the driving shaft 15 and to the pulley-halves 16 splined upon the shaft 15. Through the wedging frictional engagement of the rings 48 with the bevelled surfaces 18 of the pulley-halves 16, 23 and 24, this rotary motion is transmitted to the pulley-halves 23 and 24 and, through the sleeve 22, bevel gear wheels 25, bevel pinions 32, and bevel gear wheels 26, to the driven shafts 20.

Since the toothed detents 40 are normally pressed into engagement with the teeth of the bevel pinions 32 by the springs 41, locking the pinions 32 against rotary motion on their axes, these pinions 32 then serve to lock the bevel gear wheels 25 and 26 together for rotation. This is the condition for normal forward operation of the driven shafts 20.

Changes in the ratios of the rotary speeds of the driving shafts 15 to the rotary speeds of the driven shafts 20 are effected through the operation of the control rod 71 rotating the shaft 65 and, through the action of the threads thereon and the internal threads of the collars 68 and 69 in spiral engagement, the levers 59 are moved on their pivots 60 in such manner that given points upon the two levers 59 of each pair at equal distances from their axes move simultaneously the same distance but in directions opposite to each other. As the portions of the levers 59 on one side of their pivots 60 move so that those parts of each pair approach each other they press the pulley-halves 16 of each pair upon the driving shaft 15 toward each other, forcing the rings 48 to climb the bevelled surfaces 18 of the pulley-halves 16 accordingly, thus increasing the speed of movement of the rings 48 accordingly. As the said portions of the levers 59 recede from their close positions, due to the rotating of the shaft 65 oppositely, the pulley-halves 16 are forced apart by the weight of the rings 48, allowing the rings 48 to approach toward the axis of the driving shaft 15 and thus decreasing the speed of movement of the rings 48.

In similar manner, the portions of the levers 59 on the opposite sides of their pivots are brought together in pairs or apart in pairs urging each pulley-half 23 toward its complementary pulley-half 24 by sliding the pulley-halves 23 along the sleeves 22 upon which they are splined and by sliding the sleeves 22 and the pulley-halves 24 secured thereon toward their complementary pulley-halves 23, as those pulley-halves 16 recede from each other in their respective pairs, and vice-versa. The pressure of the levers 59 against the pulley-halves 16 is through collars 56 surrounding the driving shaft 15 and slidable thereon and pivoted by means of pins 57 in slots 58 in the levers 59. The pressure of the levers 59 against the pulley-halves 23 is through collars 62 loosely mounted upon the sleeves 22 and hingeably secured to the levers 59 by pins 63 projecting into slots 64 in the levers 59. Pressure of the levers 59 against the pulley-halves 24 is through collars 62 loosely mounted upon the shafts 20 which press against the bevel gear wheels 26, holding them in engagement with the pinions 32, and, through the hub-portions 28 of the wheels 27 and the bevel gear wheels 25. As the pulley-halves 16 of each pair upon the driving shaft 15 approach each other the pulley-halves 23 and 24 of each pair upon the driven shafts 20 recede from each other, and vice-versa. Thus, an infinite variety of speed ratios of the driven shafts 20 relative to the speed of the driving shaft 15, within a wide range, may be obtained.

To reverse the direction of rotation of the driven shafts 20 relative to the direction of rotation of the driving shaft 15 the reversing rod 46 is pulled upon and this, in turn, draws forward the equalizing bar 47 and the brake-levers 43, tightening the brake band 42 around the rim-portion 29 of the wheel 27 and locking the wheel 27 against rotation. At the same time, the tightened band 42 presses the curved member 34 into the depression 33 and, through the arm 35 operates the detent levers 38 to disengage the toothed detents 40 from the teeth of the bevel pinions 32, leaving the said pinions 32 free to rotate upon their spoke-shafts 30. Thus the forward rotation of the bevel gear wheel 25 is converted through the bevel pinions 32 to retrograde rotation of the driven shafts 20.

While both of the driven shafts 20 are normally driven at like speed, either of them may rotate faster than the other and either or both may rotate faster, in like direction, than their respective rings 48 would drive them with their rings 48 in any given positions relative to the pulley-halves 16, 23 and 24. The driven and driving action of these rings is such that while the driving shaft 15 and its pulley-halves 16 may drive the driven shafts 20 through their pulley-halves 23 and 24 and the rings 48, the driven shafts 20 cannot drive the driving shaft 15 in like direction; therefore, one of the shafts 20 may be driven from the driving shaft 15 while the other shaft 20 is independently rotating faster than it would be driven from the driving shaft 15.

I claim:

1. In transmission mechanism, the combination of a driving shaft, two driven shafts axially aligned with each other, a ring encircling and suspended from said driving shaft and one of said driven shafts in frictional driven engagement with said driving shaft and in frictional driving engagement with said one driven shaft, and a second ring encircling and suspended from the said driving shaft and the other of said driven shafts in frictional driven engagement with said driving shaft and in frictional driving engagement with said other driven shaft.

2. In transmission mechanism, the combination of two driving shafts axially aligned with each other, a driven shaft, a ring encircling and suspended from one of said driving shafts and said driven shaft in frictional driven engagement with said one driving shaft and in frictional driving engagement with said driven shaft, and a second ring encircling and suspended from the other of said driving shafts and said driven shaft in frictional driven engagement with said other driving shaft and in frictional driving engagement with said driven shaft.

3. In transmission mechanism, the combination of a rotatable member, two rotatable elements axially aligned with each other, a ring encircling and suspended from said rotatable member and one of said rotatable elements in frictional driving and driven engagement with said rotatable member and said one rotatable element, a second ring encircling and suspended from said rotatable member and the other of said rotatable elements in frictional driving and driven engagement with said rotatable member and said other rotatable element, and means adapted to render the said rotatable member the driver and either or both the said rotatable elements the driven or to render either or both the said rotatable elements the driver or drivers and the said rotatable member the driven.

4. In transmission mechanism, the combination of a driving shaft, two driven shafts axially aligned with each other, and two rings encircling and suspended from said driving shaft and one of said driven shafts respectively in driven frictional engagement with said driving shaft and with one or both of said rings in frictional driving engagement with its or their respective driven shaft or shafts.

5. In transmission mechanism, the combination of a driving shaft, two driven shafts axially aligned with each other, a multiplicity of rings encircling and suspended from said driving shaft normally in frictional driven engagement therewith and each encircling and suspended from one or the other of said driven shafts normally in frictional driving engagement therewith.

6. In transmission mechanism, the combination of a driving shaft, two axle shafts axially aligned with each other, and two rings respectively encircling and suspended from said driving shaft and one of said axle shafts and each ring adapted to be driven in one direction by said driving shaft and to drive its respective axle shaft in like direction or to be driven freely by its respective axle shaft in like direction without driving the said driving shaft.

7. In transmission mechanism, the combination of a driving shaft, two axle shafts axially aligned with each other, and two rings respectively encircling and suspended from said driving shaft and one of said axle shafts and each ring adapted to be driven in one direction by said driving shaft and to drive its respective axle shaft in like direction or to be driven by its respective axle shaft in opposite direction and to drive the said driving shaft.

8. In transmission mechanism, the combination of a driving shaft, two driven shafts axially aligned with each other, two driving pulleys secured upon said driving shaft, one driven pulley secured upon each of said driven shafts, annular grooves of substantially V-shape in cross-section in each of said driving and driven pulleys, a ring substantially V-shaped in cross-section encircling and suspended from one of said driving pulleys and one of said driven pulleys in wedging frictional driven engagement with one of said driving pulleys and in wedging frictional driving engagement with one of said driven pulleys, a second ring substantially V-shaped in cross-section encircling and suspended from the other of said driving pulleys and the other of said driven pulleys in wedging frictional driven engagement with said other driving pulley and in wedging frictional driving engagement with said other driven pulley.

9. In transmission mechanism, the combination of two driving shafts axially aligned with each other, two driving pulleys provided with annular grooves of substantially V-shaped cross sectional aspect carried respectively by each of the said two driving shafts, two rings of corresponding cross-sectional V-shaped aspect, a driven shaft, and two driven pulleys provided with annular grooves of substantially V-shaped cross-sectional aspect carried by said driven shaft, the said rings respectively each encircling and suspended from one of said driving pulleys and one of said driven pulleys in wedging frictional driven and driving engagement therewith.

10. In transmission mechanism, the combination of a shaft member, two shaft elements axially aligned with each other, two pulleys provided with annular grooves of substantially V-shaped cross-sectional aspect carried by said shaft member, two pulleys provided with annular grooves of substantially V-shaped cross-sectional aspect each carried by one of said shaft elements respectively, two rings of substantially V-shaped cross-sectional aspect each respectively encircling and suspended from one of said pulleys carried by said shaft member and one of said pulleys carried by said shaft elements in wedging frictional driving and driven engagement with said pulleys, and means adapted to render the said shaft member the driver and either or both the said shaft elements the driven or to render either or both the said shaft elements the driver or drivers and the said shaft member the driven.

11. In transmission mechanism, the combination of a driving shaft, two driving pulleys provided with annular grooves of substantially V-shaped cross-sectional aspect carried by said driving shaft, two driven shafts axially aligned with each other, two driven pulleys provided with annular grooves of substantially V-shaped cross-sectional aspect carried respectively by each of the said driven shafts, and two rings of substantially V-shaped cross-sectional aspect respectively encircling and suspended from one each of the said driving pulleys and one each of the said driven pulleys in wedging frictional driven engagement with said driving pulleys and one or both of said rings in wedging frictional driving engagement with its or their respective driven pulley or pulleys.

12. In transmission mechanism, the combination of a driving shaft, two driving pulleys provided with annular grooves of substantially V-shaped cross-sectional aspect carried by said driving shaft, two driven shafts axially aligned with each other, two driven pulleys provided with annular grooves of substantially V-shaped cross-sectional aspect carried respectively by each of the said driven shafts, and two rings of substantially V-shaped cross-sectional aspect respectively encircling and suspended from one each of the said driving pulleys and one each of the said driven pulleys in wedging frictional driving or driven engagement with their respective driving pulleys and their respective driven pulleys.

13. In transmission mechanism, the combination of a primary shaft, two primary pulleys provided with annular grooves of substantially V-shaped cross-sectional aspect carried by said primary shaft, two secondary shafts axially aligned with each other, two secondary pulleys provided with annular grooves of substantially V-shaped cross-sectional aspect carried one by each of said secondary shafts respectively, two rings of substantially V-shaped cross-sectional aspect each encircling and suspended from one of said primary pulleys and one of said secondary pulleys normally in wedging frictional engagement with said pulleys and either or both of said rings in driven or driving engagement with its or their respective primary pulley or pulleys and in driven or driving engagement with its or their respective secondary pulleys.

14. In transmission mechanism, the combination of a driving shaft, a multiplicity of driving pulleys provided with annular grooves of substantially V-shaped cross-sectional aspect carried by said driving shaft, two driven shafts axially aligned with each other, one or more driven pulleys provided with annular grooves of substantially V-shaped cross-sectional aspect carried by each of said driven shafts, and rings of substantially V-shaped cross-section each encircling and suspended from one of said driving pulleys and one of said driven pulleys in wedging frictional driving or driven engagement with said pulleys.

15. In transmission mechanism, the combination of a driving shaft, two driving pulleys provided with annular grooves of substantially V-shaped cross-sectional aspect carried by said driving shaft, two axle shafts axially aligned with each other, two driven pulleys provided with annular grooves of substantially V-shaped cross-sectional aspect and carried respectively by said axle shafts, and two rings of substantially V-shaped cross-sectional aspect respectively encircling and suspended from one each of said driving pulleys and said driven pulleys and each ring adapted to be driven in one direction by its complementary pulley on said driving shaft and to drive its complementary driven pulley in like direction or to be driven freely by its complementary axle shaft pulley in like direction without driving the said driving shaft through its complementary pulley on said driving shaft.

16. In transmission mechanism, the combination of a driving shaft, two driving pulleys provided with annular grooves of substantially V-shaped cross-sectional aspect carried by said driving shaft, two axle shafts axially aligned with each other, two driven pulleys provided with annular grooves of substantially V-shaped cross-sectional aspect and carried respectively by said axle shafts, and two rings of substantially V-shaped cross-sectional aspect respectively encircling and suspended from one each of said driving pulleys and said driven pulleys and each ring adapted to be driven in one direction by its respective driving pulley and to drive its respective driven pulley in like direction or to be driven by its respective axle shaft pulley in opposite direction and to drive its respective driving shaft pulley in said opposite direction.

17. In transmission mechanism, the combination of a driving shaft, two axle shafts. and wedging frictional driving and driven means adapted to transmit rotary motion from said driving shaft to either or both of said axle shafts but automatically permitting either or both of said axle shafts to be rotated at greater speed in like direction by other driving means.

18. In transmission mechanism, the combination of a driving shaft, two driven shafts, and two rings each encircling and suspended from said driving shaft and one of said driven shafts in frictional driven engagement with said driving shaft and in frictional driving engagement with their respective driven shafts whenever and while either or both of said rings is or are being driven by said driving shaft at greater speed than its or their respective driven shaft or shafts tend to drive it or them in like direction but either or both said ring or rings operatively disengaged from its or their respective shafts whenever and while either or both of said rings is or are tending to be driven by its or their respective driven shaft or shafts in like direction but at greater speed than its or their driving shaft tends to drive it or them.

19. In transmission mechanism, the combination of a driving shaft, two pulleys carried by said driving shaft and provided with annular grooves of substantially V-shaped cross-sectional aspect, two axle shafts axially aligned with each other, two pulleys provided with annular grooves of substantially V-shaped cross-sectional aspect carried by each of the said axle shafts respectively, and two rings of substantially V-shaped cross-sectional aspect respectively encircling and suspended from one driving shaft pulley and one axle shaft pulley, each in wedging frictional driven engagement with its respective driving shaft pulley and in wedging frictional driving engagement with its respective axle shaft pulley and adapted to transmit rotary motion from said driving shaft pulleys to either or both of said axle shaft pulleys but automatically permitting either or both of said axle shaft pulleys to be rotated at greater speed in like direction.

20. In transmission mechanism, the combination of a driving shaft, two driving pulleys provided with annular grooves of substantially V-shaped cross-sectional aspect carried by said driven shaft, two driven shafts axially aligned with each other, two driven pulleys provided with annular grooves of substantially V-shaped cross-sectional aspect carried one by each of said driven shafts respectively, two rings of substantially V-shaped cross-sectional aspect respectively encircling and supported by one of said driving pulleys and one of said driven pulleys in wedging frictional driven and driving engagement therewith, and means for reversing the directions of rotation of said driven shafts relative to the direction of rotation of said driving shaft.

21. In transmission mechanism, the combination of a driving shaft, two pulleys each constructed of two separate circular halves rotatable with and by said driving shaft and with one of the faces of each said pulley-half bevelled in such manner that an annular channel of substantially V-shaped cross-sectional aspect is formed between the two halves of each said pulley, two driven shafts in axial alignment with each other, two driven pulleys each constructed of two separate circular halves with each of said halves of said driven pulleys having a bevelled face coacting with its complementary pulley-half to form an annular channel of substantially V-shaped cross-sectional aspect between the two halves of each of said driven pulleys which said driven pulleys are respectively loosely mounted one upon each of the said driven shafts, means for locking the said driven pulleys each to its respective driven shaft to rotate said driven shafts therewith, means for transmitting and converting the rotary motions of said driven pulleys to retrograde rotary motions of said driven shafts at will, and two rings of substantially V-shaped cross-sectional aspect each encircling and suspended from one each of the said pulleys carried by said driving shaft and of the said driven pulleys normally in wedging frictional driven engagement with its respective pulley carried by said driving shaft and in wedging frictional driving engagement with its respective driven pulley.

22. In transmission mechanism, the combination of a driving shaft, two axially aligned driven shafts, two rings encircling and suspended from said driving shaft and respectively from one of said driven shafts and adapted to transmit rotary motion from said driving shaft to said driven shafts, and means adapted to vary the ratio of the rotary speed transmitted to said driven shafts to the rotary speed of said driving shaft.

23. In transmission mechanism, the combination of a driving shaft, two driven shafts, two rings each encircling and suspended from said driving shaft and one of said driven shafts respectively and adapted to transmit rotary motion from said driving shaft to said driven shafts, and means adapting said rings to transmit said rotary motion at varying ratios between the speeds of said driving shaft and the speeds of said driven shafts.

24. In transmission mechanism, the combination of a driving shaft, two driven shafts, two rings each encircling and suspended from said driving shaft and one of said driven shafts respectively in frictional driven and driving engagement with said driving and driven shafts, and means for varying the ratio of the rotary speed of said driven shafts to the rotary speed of said driving shaft.

25. In transmission mechanism, the combination of a driving shaft, two pulleys provided with annular grooves of substantially V-shaped cross-sectional aspect carried by said driving shaft, two driven shafts, two pulleys provided with annular grooves of substantially V-shaped cross-sectional aspect one upon each of the said driven shafts respectively, two rings each encircling and suspended from one driving shaft pulley and one driven shaft pulley, and means for varying the widths of the said grooves of said pulleys at will.

26. In transmission mechanism, the combination of a driving shaft, two driving pulleys carried by said driving shaft, two driven shafts, two driven pulleys each upon one of said driven shafts respectively, two rings each encircling and suspended from one of said driving pulleys and one of said driven pulleys in frictional driven and driving engagement therewith, and means for varying the distances from the axes of said pulleys of said frictional engagements.

27. In transmission mechanism, the combination of a driving shaft, two driving pulleys each composed of two circular separate halves carried by said driving shaft and having bevelled sides facing each other to form substantially V-shaped annular channels between each pair of halves, two axially aligned driven shafts, two driven pulleys each composed of two separate circular halves having bevelled sides facing each other to form substantially V-shaped annular channels between each pair of halves and one of said driven pulleys upon each of said driven shafts, two rings of substantially V-shaped cross-sectional aspect each encircling and suspended from one driving pulley and one driven pulley in wedging frictional engagement therewith, and means under the control of the operator for varying the widths of the said annular channels between the said halves of the said driving pulleys relative to the widths of the said annular channels between the said halves of the said driven pulleys, and for varying the widths of the said annular channels between the said halves of the said driven pulleys relative to the widths of the said annular channels between the said halves of the said driving pulleys.

28. In transmission mechanism, the combination of a driving shaft, two driving pulleys each composed of two separate circular halves carried by said driving shaft and having bevelled sides facing each other to form substantially V-shaped annular channels between each pair of said halves, two axially aligned driven shafts, two driven pulleys each composed of two separate circular halves having bevelled sides facing each other to form substantially V-shaped annular channels between each pair of said halves and one of said driven pulleys upon each of said driven shafts, two rings of substantially V-shaped cross-sectional aspect each encircling and suspended from one driving pulley and one driven pulley in wedging frictional driven and driving engagement therewith, and means under the control of the operator for varying the widths of the said annular channels between the said halves of the said driving and said driven pulleys inversely to each other.

29. In transmission mechanism, the combination of a driving shaft, two driven pulleys provided with annular grooves of substantially V-shaped cross-sectional aspect carried by said driving shaft, two driven shafts axially aligned with each other, two driven pulleys provided with annular grooves of substantially V-shaped cross-sectional aspect each upon one of said driven shafts respectively, two rings of substantially V-shaped cross-sectional aspect respectively encircling and supported by one of said driving pulleys and one of said driven pulleys in wedging frictional driving and driven engagement therewith, and means for reversing the directions of rotation of either or both of said driven shafts relative to the direction of rotation of said driving shaft.

CHARLES H. GILL.